Figure 1:
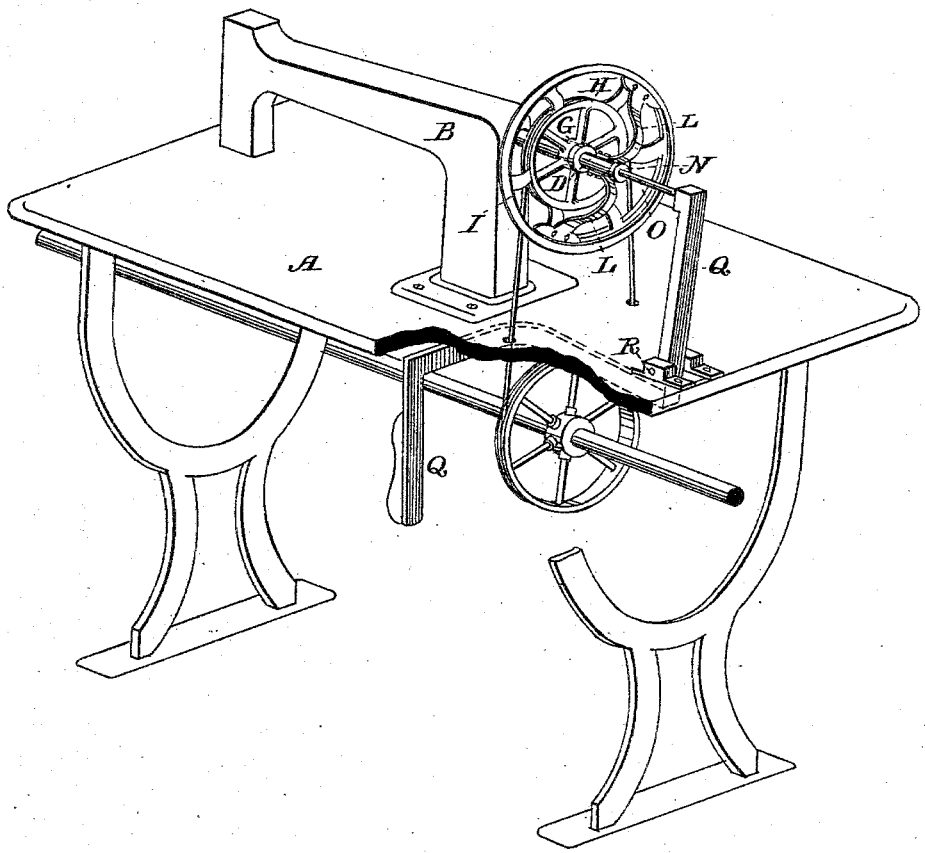

(No Model.) 2 Sheets—Sheet 1.

M. KRAKER.
CLUTCH MECHANISM.

No. 283,493. Patented Aug. 21, 1883.

Witnesses,
H. F. Dexter
J. H. Towne

Inventor
M. Kraker
By Dewey & Co
Attorneys (No Model.) 2 Sheets—Sheet 2.
M. KRAKER.
CLUTCH MECHANISM.
No. 283,493. Patented Aug. 21, 1883.
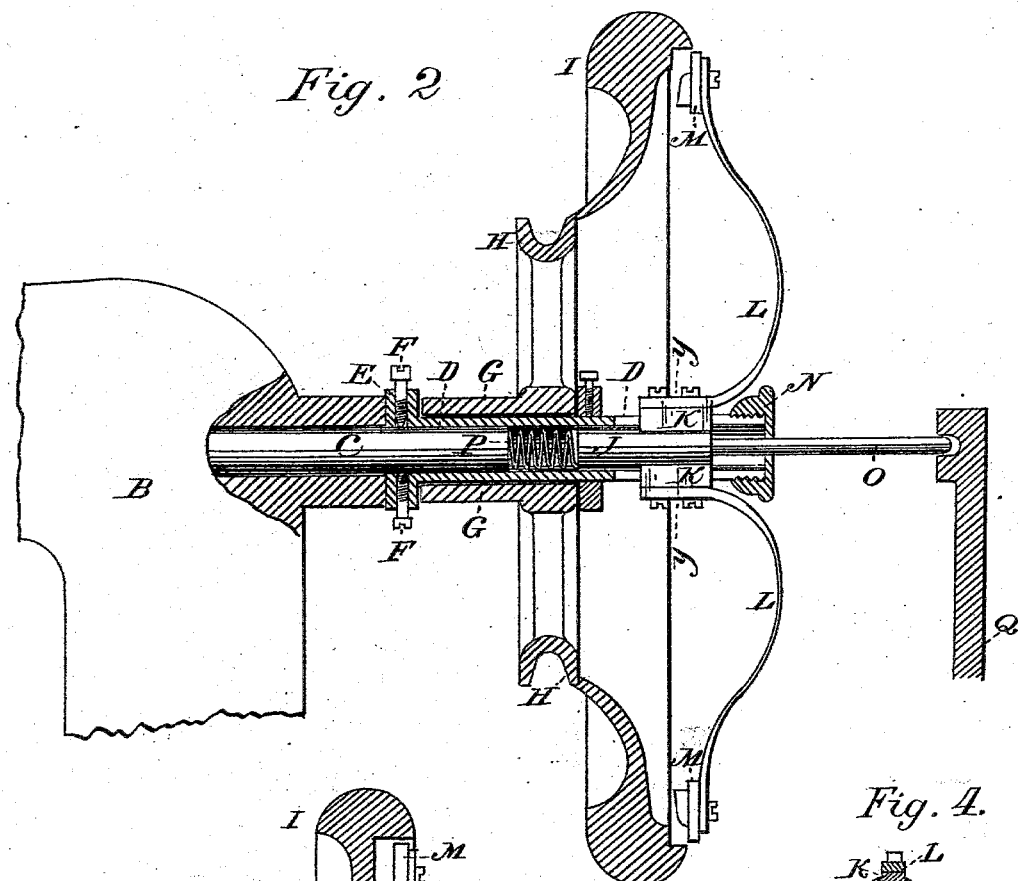
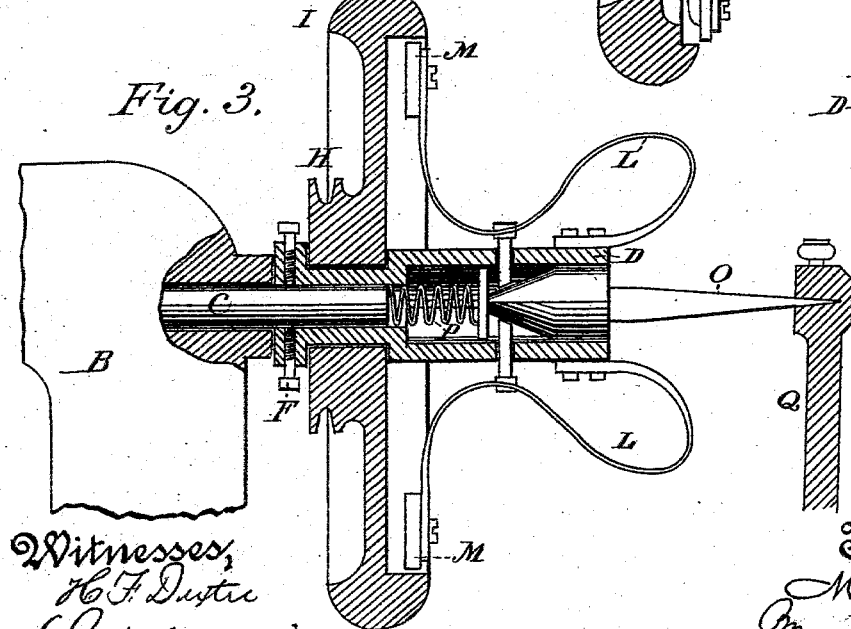
Witnesses:
Inventor:
M. Kraker
By Dewey & Co.
Attorneys

UNITED STATES PATENT OFFICE.

MICHAEL KRAKER, OF SAN FRANCISCO, CALIFORNIA, ASSIGNOR OF TWO-THIRDS TO M. ISRAEL AND OSCAR SCHMIDT, OF SAME PLACE.

CLUTCH MECHANISM.

SPECIFICATION forming part of Letters Patent No. 283,492, dated August 21, 1883.

Application filed June 5, 1883. (No model.)

*To all whom it may concern:*

Be it known that I, MICHAEL KRAKER, of the city and county of San Francisco, State of California, have invented an Improvement in Clutch Mechanism; and I hereby declare the following to be a full, clear, and exact description thereof.

My invention relates to a means for applying power to sewing-machines, so that they may be set in motion from a continuously-moving shafting, or stopped without interfering with the motion of said shaft; and it consists of a peculiar frictional attachment operating directly upon the needle-driving shaft, and a mechanism by which it may be applied or disengaged instantly, and without the use of a treadle, as will be more fully explained by reference to the accompanying drawings, in which—

Figure 1 is a perspective view of the frictional device. Fig. 2 is a vertical section taken through the line of the shaft. Fig. 3 is a vertical section taken through the line of the shaft, showing a modification. Fig. 4 is a cross-section on the line *y y*, Fig. 2.

In establishments where sewing-machines are used in large numbers they are usually driven by power which is communicated through a shaft extending beneath the tables of the machines set in line, and the power is applied through a mechanism connecting with the shaft by a treadle beneath the machine. This is objectionable, because the space beneath the machine is so occupied that it cannot be kept clean, and because; by applying the power to a shaft beneath the table and then having a belt from a wheel upon this shaft to a pulley upon the shaft above the table, it takes longer to start and stop the machine, and it is not so manageable.

In my device, A is the table of a sewing-machine. B is the arm above the table, supporting the needle-bar-operating mechanism and the shaft C, by which the needle is driven. This shaft passes out through the rear end of the arm B, and has a sleeve, D, fitted to it and extending beyond its end. This sleeve has a collar, E, through which set-screws F pass to secure it to the shaft. Upon the sleeve D the hub G of the belt-pulley H turns freely, and the balance-wheel rim I is supported by arms from the belt-pulley, as shown, so as to turn with it. That part of the sleeve D which extends beyond the wheel-hub G is slotted upon opposite sides, and a short shaft, J, fits within it, having lugs K, projecting out through the slots to receive the curved elastic arms L, which have broad frictional plates M, bolted to their outer ends. A nut, N, screws upon the outer end of the sleeve D and holds the shaft J and lugs K in place, and is perforated to receive a pin, O, which may be pressed against the end of the shaft J. A spiral spring, P, fits inside the hollow sleeve D, between the end of the shaft C and the shaft J, and it keeps the latter pressed outward, so that the plates M cannot come in contact with the rim of the wheel I. This rim has surfaces turned upon it, against which the plates M may be forced, and when this is done these and the arms L, lugs K, and through them the sleeve D, will be caused to rotate, thus driving the shaft C, to which the sleeve is fixed, as before described. The plates M, arms L, and shaft J are pressed inward against the pressure of the spring P by means of a bent lever, Q, having its fulcrum at R and one arm connected with the pin O, while the other extends down beneath the table, so that the operator may press it to one side by moving the knee slightly, and thus force the plates M into contact with the constantly-moving rim I. By this construction the most delicate control is obtained over the needle, and a single stitch, or any desired number, may be made, as there is no momentum gained to continue the motion after the clutch has been released, because there are no heavy parts connected with the shaft C to continue the motion.

Fig. 3 shows a modification of my device, in which the pin O moves a cone within the sleeve, and thus acts upon pins connected with the spring-arms L, so as to force them outward and cause the shoes M to act.

Having thus described my invention, what I claim as new, and desire to secure by Letters Patent, is—

1. In a sewing-machine, the means for communicating motion to the needle-driving shaft, consisting of a continuously-running pulley, H, to which power is communicated, and a frictional rim, I, connected with said pulley, both turning loosely upon a sleeve which is fixed to said shaft, and arms so connected with the sleeve that they may be moved into contact with the rotating wheel-rim, so as to be driven and carry with them the needle-driving shaft, substantially as herein described.

2. In a sewing-machine, a loosely-moving pulley, H, to which power is communicated, a sleeve which is fixed to the needle-driving shaft, and arms so connected with the sleeve that they may be moved into contact with the pulley-rim, so as to set the sleeve and shaft in motion, in combination with a pressure-pin and actuating-lever, by which the movement of the arm is effected, substantially as herein described.

3. In a sewing-machine, the needle-driving shaft, a sleeve keyed to it, said sleeve being slotted at its outer end, the lugs K, the shaft J, and the elastic arms L, with their frictional plates or shoes M, in combination with the pulley I, turning loosely upon the sleeve, and the pin O and lever Q, by which the shaft J is moved and the shoes brought into contact with the wheel-rim, substantially as herein described.

4. In a sewing-machine having the sleeve D fixed to the shaft C and projecting beyond it, the wheel I, turning loosely upon said sleeve, and the arms L, having frictional shoes and connected with the sleeve, so as to turn with it and be moved to or from the wheel-rim, in combination with the pressure-pin O, by which the shaft carrying the arm L may be forced inward, and the returning-spring P, substantially as herein described.

In witness whereof I have hereunto set my hand.

MICHAEL KRAKER.

Witnesses:
MORRIS MARCUSE,
C. D. COLE.